United States Patent [19]
Kosiarski et al.

[11] Patent Number: 6,024,004
[45] Date of Patent: Feb. 15, 2000

[54] FIBER OPTIC TERMINATOR TOOL

[75] Inventors: Joseph P. Kosiarski, Rahway; Wagner Da Silva Aguiar, Hillside, both of N.J.

[73] Assignee: Communications Systems, Inc., Hector, Minn.

[21] Appl. No.: 09/017,367

[22] Filed: Feb. 2, 1998

[51] Int. Cl.[7] .................................................. B26F 1/40
[52] U.S. Cl. .......................................... 83/879; 225/965
[58] Field of Search ............................... 83/879, 14, 880, 83/881, 886, 887, 16; 225/96.5, 101–105, 2; 464/87

[56] References Cited

U.S. PATENT DOCUMENTS

| | | | |
|---|---|---|---|
| 2,523,936 | 9/1950 | Axelsen | 81/9.5 |
| 2,871,622 | 2/1959 | Singer et al. | 49/48 |
| 3,160,339 | 12/1964 | Love | 225/96.5 |
| 3,342,041 | 9/1967 | Nebiker, Jr. | 464/87 |
| 3,636,728 | 1/1972 | Walker | 464/87 |
| 3,667,662 | 6/1972 | Gilford et al. | 225/96.5 |
| 3,934,773 | 1/1976 | Chinnock et al. | 225/2 |
| 3,981,422 | 9/1976 | Moore | 225/2 |
| 4,017,013 | 4/1977 | Hawk et al. | 225/96.5 |
| 4,027,814 | 6/1977 | Gloge et al. | 225/104 |
| 4,074,840 | 2/1978 | Fulenwider et al. | 225/96.5 |
| 4,084,308 | 4/1978 | Runge | 83/14 |
| 4,154,385 | 5/1979 | Lewis | 225/96.5 |
| 4,156,372 | 5/1979 | Wenninger | 464/87 |
| 4,159,793 | 7/1979 | Belmonte et al. | 225/96.5 |
| 4,168,026 | 9/1979 | Lukas et al. | 225/96.5 |
| 4,202,475 | 5/1980 | Hirai et al. | 225/2 |
| 4,257,546 | 3/1981 | Benasutti | 225/96.5 |
| 4,274,572 | 6/1981 | Dunn et al. | 225/96.5 |
| 4,331,004 | 5/1982 | Schmidt | 464/87 |
| 4,372,048 | 2/1983 | Basile et al. | 30/124 |
| 4,445,632 | 5/1984 | Margolin et al. | 225/2 |
| 4,503,744 | 3/1985 | Garner et al. | 83/879 |
| 4,644,647 | 2/1987 | Szostak et al. | 83/879 |
| 4,662,710 | 5/1987 | Berge | 225/96.5 |

FOREIGN PATENT DOCUMENTS 0 509 737 A2  10/1992  European Pat. Off. .

OTHER PUBLICATIONS

Automatic Tool & Connector Co. drawing CT–06, Cleave Tool (public use at least 1995).

Automatic Tool & Connector Co. "Proudly Presents . . . The Terminator", published 1995.

*Primary Examiner*—Kenneth E. Peterson
*Assistant Examiner*—Gyounghyun Bae
*Attorney, Agent, or Firm*—Westman, Champlin & Kelly, P.A.

[57] ABSTRACT

A terminating tool for scribing a cleavage line on an optical fiber, which is made of a brittle material, the tool holds the fiber in two locations. A connector for the outer sleeve covering the fiber is supported at one location, and the other support includes a bar that compresses the fiber against an anvil through a resilient material. A scribing disc is mounted on a flexible arm and is slid transverse the fiber at a location so the disc engages a portion of the fiber periphery as the flexible arm deflects to permit the disc to move transversely to the fiber. A slide mounts the flexible arm carrying the disc, and the slide is moved through a second flexible link to reduce the transmission of unwanted motions to the slide, so that an accurate scribe line can be made on the fiber.

20 Claims, 5 Drawing Sheets

FIBER OPTIC TERMINATOR TOOL

BACKGROUND OF THE INVENTION

The present invention relates to a terminator tool for fiber optic cables that will work with several different types of connectors, and provide for a simplified, reliable tool that utilizes a flexibly mounted scribe disc for making a suitable score line on the fiber optic cable.

In the prior art, various types of fiber optic scribe and cleavage tools have been advanced. For example, U.S. Pat. No. 4,445,632 shows a tool that is actuated upon squeezing a pair of handles to first grasp a fiber optic cable and hold it securely, and then run a rotating cutting tool across the cable to score it. The cable is then separated by applying a tension load on the cable. The tool requires a large number of parts; and a more compact arrangement has been utilized, which continues to utilize a rigidly mounted, rotating scribe wheel that runs across a portion of the periphery of the exposed fiber optic cable.

SUMMARY OF THE INVENTION

The present invention relates to an operating tool which supports an optical fiber that has been stripped of its insulation and which will cause a sharpened edge disc having a sharpened edge to be slid transversely across the fiber, leaving a score line that can define a break line or cleavage when the fiber is subjected to tension. The disc is held on a flexible support arm so that it will initially engage a side portion of the periphery of the optical fiber and, as it is moved further, will deflect down around the periphery, and then back up to provide a score line along a portion of the outer circumference of the optical fiber. The separation is then achieved by applying a tension to the end of fiber that extends out from the tool.

The deflectable disc that moves across the glass fiber will operate satisfactorily across a wide range of positions of the fiber, and using a flexible disc support reduces the amount of adjustment that is necessary for accurate scribing. A slide carries the flexible arm and disc and the slide is connected to an actuator slide mechanism by a flexible link. The flexible link isolates the actuator mechanism from transferring motion to the scribe disc so that the disc will remain oriented correctly and will deflect around the optical fiber because of its resilient mounting.

The tool has a fiber optic connector holder or mounting ferrule that is utilized for receiving several different types of connectors for wide usability. The connector holder or ferrule is clamped in place so that it cannot move vertically. Further, the fiber itself is clamped against an anvil with a slide having a rubber or elastomeric tip that will accommodate some misalignment and will be less likely to cause breakage of the fiber at the location where it is held. The connector holder, where the connector for the optical fiber cable is inserted during the scribing and cleaving process, has a spring-loaded ball plunger along one side to urge the connector to one side of the holder to provide for better positioning of the connector and the cable relative to the scribing disc.

The operation is accurate and reliable because of the flexible mounting arm for the disc and the flexible link utilized, and also because of the rubber-tipped slide for clamping the exposed fiber. Less time is needed for adjustment and assembly, and the number of parts that are used is reduced. The tool base provides a very stable support, so that there is not any shifting of the fiber during the scoring and cleaving operations. Additionally, the ease of assembling the parts reduces the overall cost, while maintaining a very precise scoring and cleaving tool.

DETAILED DESCRIPTION OF THE PREFERRED EMBODIMENTS

A tool of the present invention is shown generally at 10 and comprises a unitary base member 12 that has various recesses formed for guides and clearance, as will be described. The base member is a frame that can have an outer case wall 13.

The actuator for operating the tool comprises a spring-loaded plunger assembly, indicated generally at 14, which includes a linear cam plunger 16 and a spring-loaded sleeve 18 both attached to a plunger plate 26. The spring loaded sleeve 18 has an internal spring 20. The sleeve 18 slides in a bore, shown in dotted lines at 22 in FIG. 1 in an end block 24 (see FIG. 2) forming part of the base 12. The spring 20 bears against the end of the bore 22 and is of sufficient strength so that it will return the plunger 16 to the solid line position shown in FIG. 1 when the plunger is released. The force of spring 20 can be overcome by manual force of a hand gripping the base with the heel of the hand on the plunger plate 26.

The plunger cam 16 is a flat, relatively heavy slider that has cam portions formed on its edges. On one side, there is a retracting cam surface 28, and, on an opposite side, there is an actuating cam surface 30. The operation of the scribe and cleaving tool is such that an optical fiber 32, which is a thin glass strand broken away in FIG. 1, will be held against an anvil surface under spring pressure before the fiber outer surface is scored or scribed where cleavage is to take place. The score line is adjacent to a connector 29 (FIG. 4) in a connector holder 34 on the opposite side of the frame 12, the fiber scoring or scribing assembly is illustrated generally at 36, and also is adjacent the connector holder 34.

Figure 1:
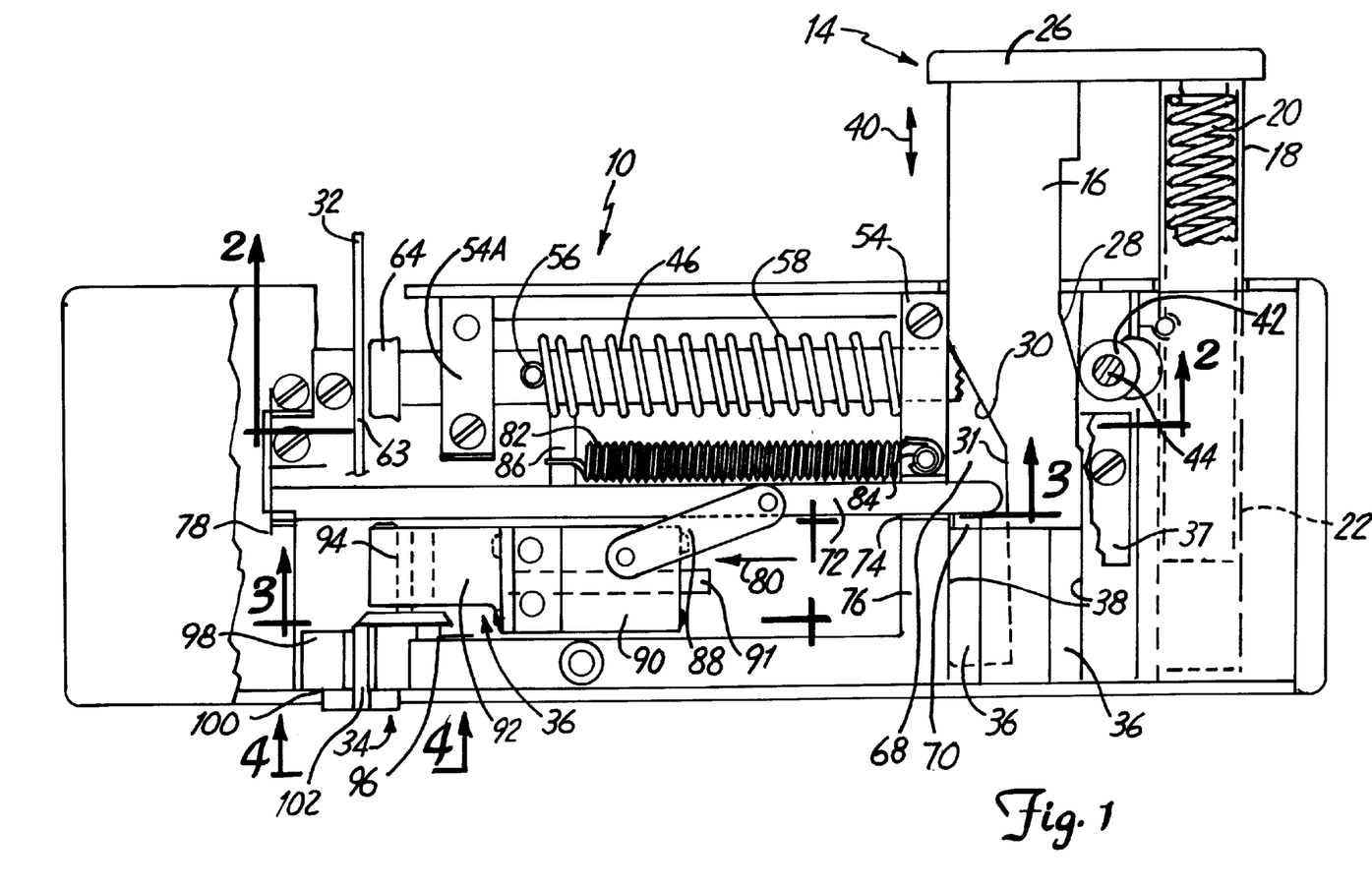
FIG. 1 is a side elevational view of a scoring and cleaving tool made according to the present invention, with a cover removed for sake of clarity, and with parts broken away.
Figure 2:
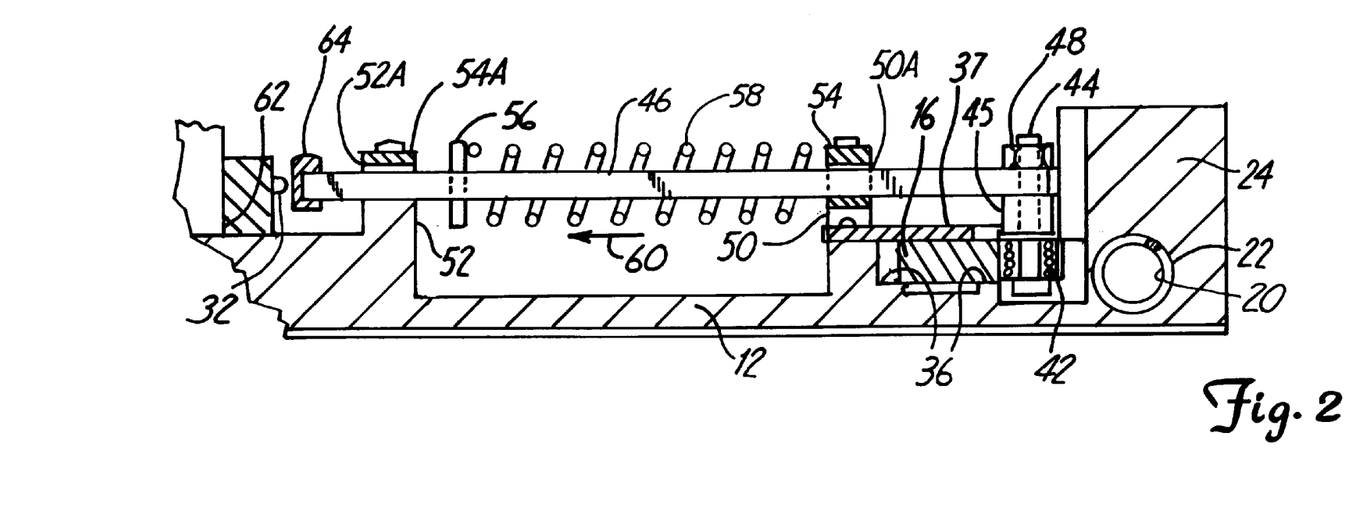
FIG. 2 is a sectional view taken as on line 2—2 in FIG. 1.
Figure 3:
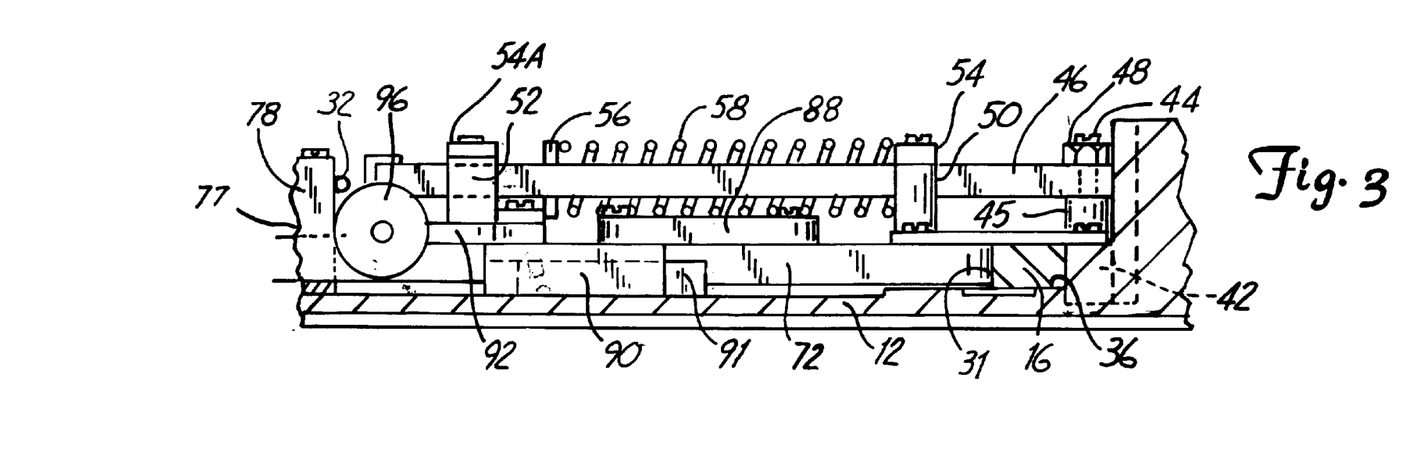
FIG. 3 is a sectional view taken as on line 3—3 in FIG. 1.

As can be seen in FIGS. 2 and 3, the cam plunger 16 is slidably mounted on guideway surfaces 36A on the top of ribs formed on the base. The plunger 16 also is supported between side guide surfaces 38 for movement in and out, as indicated by double-arrow 40. The edge of the plunger having the retracting cam surface 28 is engaged by a roller bearing 42 that is mounted onto a capscrew 44, carried on a fiber clamp slide bar 46. A spacer 45 on the capscrew 44 is positioned between the bearing 42 and the clamp slide bar 46. A nut 48 clamps the bearing, slide bar and spacer together. The slide bar 46 is supported on a pair of guides 50 and 52 (see FIGS. 2 and 3), which are formed integrally with the base and have recesses 50A and 52A for receiving and slidably guiding the clamp slide bar 46. The clamp slide bar 46 is held in position in the recesses with suitable cover plates 54 and 54A. A pin 56 extends through the bar 46 near guide 52 and provides a reaction mounting member for a spring 58 that acts between the pin 56 and the wall of guide 50 by bearing against the end surface of the guide 50 and the edge of cover plate 54. The spring 58 loads the clamp slide bar 46 in the direction as indicated by the arrow 60 in FIG. 2. This spring load urges the end of the clamp slide bar 46 toward an anvil surface 62 on an anvil block 63. The end of the clamp slide bar 46 has a rubber cover 64 mounted thereon. The spring 58 is selected in size so that it will be of less force than the reaction load created by the retracting cam surface 28 as loaded by the spring 20, so that when the plunger plate 26 is released and spring moves the plunger outwardly, the cam surface 28 will act on the roller 42 and will retract the fiber clamp slide bar 46 to the position shown in FIG. 1 and in FIG. 2. When the plunger 14 is pushed inwardly, it can be seen that the cam surface 28 will permit the screw 44 to respond to the force of the spring 58, which will permit the clamp slide bar 46 to move toward the anvil surface 62. This will clamp a glass fiber 32 that is positioned between the anvil and the rubber tip 64.

The clamp slide bar 46 is free to slide back and forth in its guides, as controlled by the cam surface 28 and the spring 58. The spring 58 limits the clamping force against the fiber 32 as it engages the anvil surface 62. The rubber tip 64 is compliant, as well, so that there is less likelihood of causing an unwanted break at the place where the fiber 32 is held against the anvil.

It should be noted that the plunger slide 16 is held in its guideways and against the surfaces 36 with a slide retainer plate 37 that is suitably fastened on surfaces on the base. The slide retainer plate 37 is positioned below the fiber clamp slide bar 46, as can be seen in FIG. 2.

The fiber scoring or scribing assembly 36 shown in FIG. 1 as well be described is also operated by cam surface 30 on the plunger slide 16. The cam surface 30 is an inwardly-inclined surface that is formed by a recess 68 formed along an edge opposite the cam surface 28. The plunger slide 16 has an end stop leg 70 that is at the distal end of the recess 68, as shown in FIG. 1. The fiber scoring or scribe assembly 36 includes a scribing disc slide arm 72 is slidably mounted adjacent one end in a support recess 74 on a cross member 76, formed on the base adjacent the plunger slide 16. The scribing discs slide arm 72 also is slidably mounted at its other end on a suitable guide channel 77 formed in a raised block 78 at the opposite end of the base.

The one end of the scribing disc slide arm 72 positioned in recess 68 is rounded and it will ride against an edge surface 31 that joins the inclined cam surface 30 when the plunger slide 16 is initially moved inward so that the scribing disc slide arm 72 does not move axially longitudinally during the time the retracting cam surface 28 permits the clamp slide bar 46 to move to clamp the fiber. After the clamp slide bar 46 has moved along surface 28, further inward movement of plunger slide 16 causes the inclined surface 30 to engage the rounded end surface of the scribing disc slide arm 72, and arm 72 will be forced in direction as indicated by the arrow 80 in FIG. 1 against the force of a return spring 82. The return spring 82 is connected to a support on the base 12 at one end, and onto a pin 86 at the other end. The pin 86 is mounted in the scribing disc slide arm 72, and since the pin 84 on the base is stationary the spring 82 will be tensioned when the scribing disc slide arm 72 moves in the direction of arrow 80.

A flexible link 88 is mounted with a suitable screw to the top surface of the scribing disc slide arm 72 and extends laterally at an angle. The second end of link 88 is mounted with a screw to a slide block 90 that is supported on a surface of a portion of the base 12, as shown in FIG. 3. The slide block 90 is guided with a rib 91 that slides in a mating groove on the underside of the slide block. The slide block 90 carries a flexible scribing disc support arm 92 at one end. The scribing disc support arm 92 as shown is a strap of flexible material, such as polyurethane, that is fairly flexible and has a thicker outer end, which mounts a shaft 94 on which a scribing disc 96 is supported. The disc 96 is nonrotating, and it is positioned to be closely adjacent to an inner surface of a fiber optic cable connector support or holder 98 that is clamped in place on the slide block adjacent one side. The upper edge of disc 96 is at a level so that it will engage the fiber 32 when the disc moves transversely. The scribing disc slide arm 72, the flexible link 88, slide block 90, scribing disc support arm 92, and scribing disc 96 all comprise parts of the fiber scoring and scribing assembly 36. The connector support or holder 98 forms part of the support assembly 34. When the plunger 14 is moved inwardly, the surface 30 will push the slide arm 72, which, in turn, will move the slide block 90 through the flexible link 88 to cause the disc 96 to move across a central bore 100 in the connector support 98 to cause the sharpened edge of the scribing disc 96 to slide along fiber 32 that extends through the bore of the connector support and cause the surface of the fiber to be scribed or scored along a portion of its periphery. The scribing disc 96 will deflect down around the fiber and then back up as it is moved across the fiber. The resilient arm 92 provides a resilient force to keep the disc edge engaged with the fiber.

Figure 4:
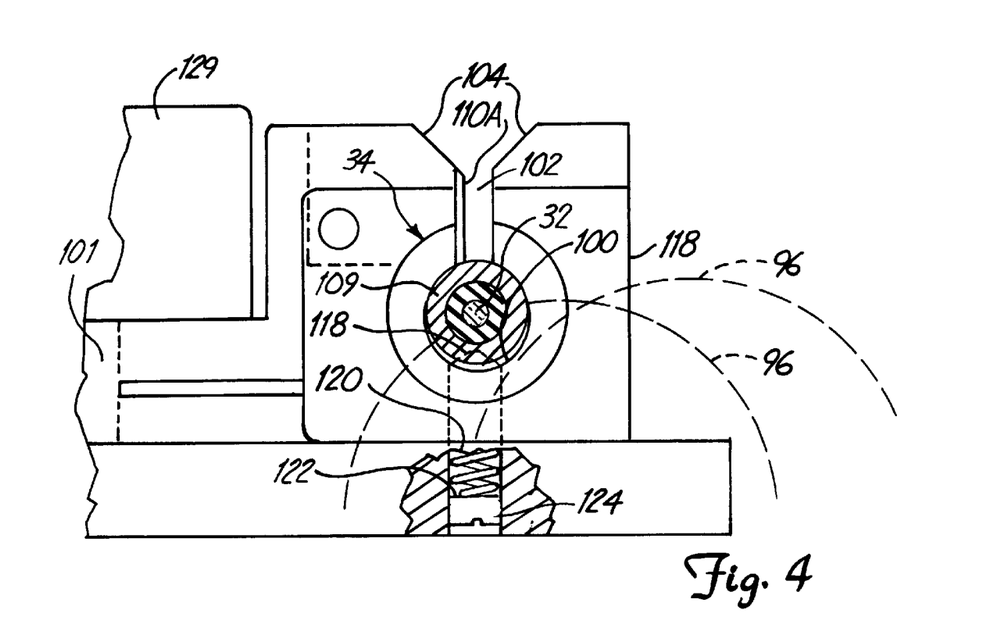
FIG. 4 is an end view of a connector holder and taken as on line 4—4 in FIG. 1, with the connector holder shown greatly enlarged.

FIGS. 4 through 8 show enlarged views of the connector support 98 and its guide, and it can be seen that at a rest position, the top of the scoring or scribing disc 96 is transversely aligned with the bore in the connector support 98 as shown in FIG. 4 so that when the disc is moved laterally by slide arm 72, link 88 and slide block 90, the disc 96 will move across the space at the end of the bore 100 if there is nothing in the way. When the edge 96A of the disc 96 engages the fiber 32, the disc 96 deflects because of the flexible support arm, but leaves a scribe line as it slides along the surface of the fiber being held in a connector 29, which, in turn, is supported in the connector support or connector holder. The ability of the disc 96 to deflect insures that it will not merely be rammed against the fiber 32 to cause a deep score or cracking of the fiber but, rather, will leave a scribe line as it slides across the outer periphery of the fiber. The scribe line can be nearly 180° of the periphery of the fiber.

The connector support 98 is slidably mounted on the end of the base 12 and will move to provide tension on the fiber 32 to cleave the fiber after scribing or scoring. A slide bar 101 supports the connector holder 98 and extends laterally along a provided support surface 103 formed on the base. The connector holder 98 is slidably mounted for limited movement for purposes of providing cleavage of the fiber 32. The slide bar 101 is spring loaded with a spring 105 in a bore in the bar. The spring 105 reacts against a block 107 that has a bore with an adjustment screw 105A that can be threaded to adjust spring force on the connector holder.

Figure 6:
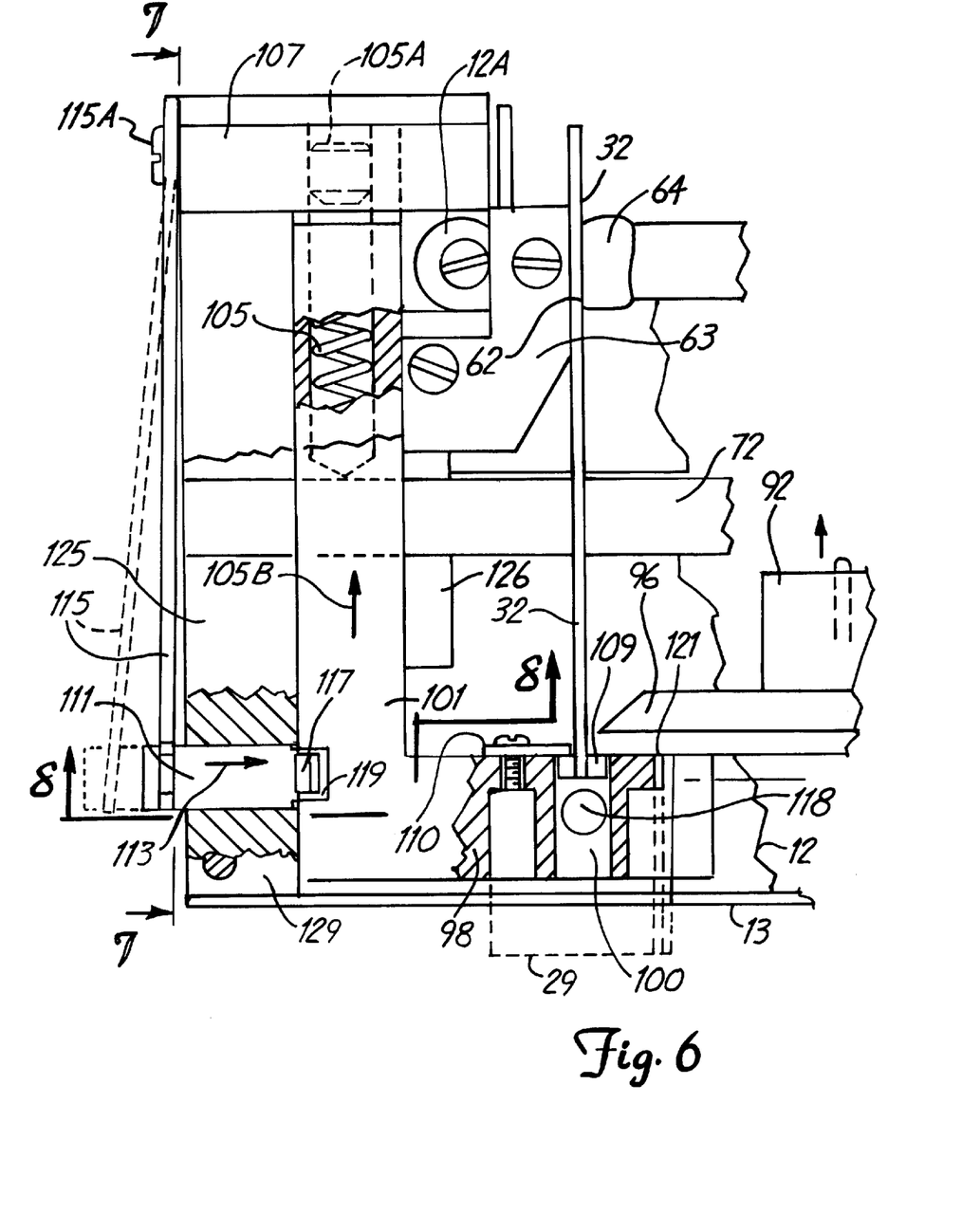
FIG. 6 is an enlarged fragmentary top view of the connector holder assembly in position to start the scoring operation.
Figure 7:
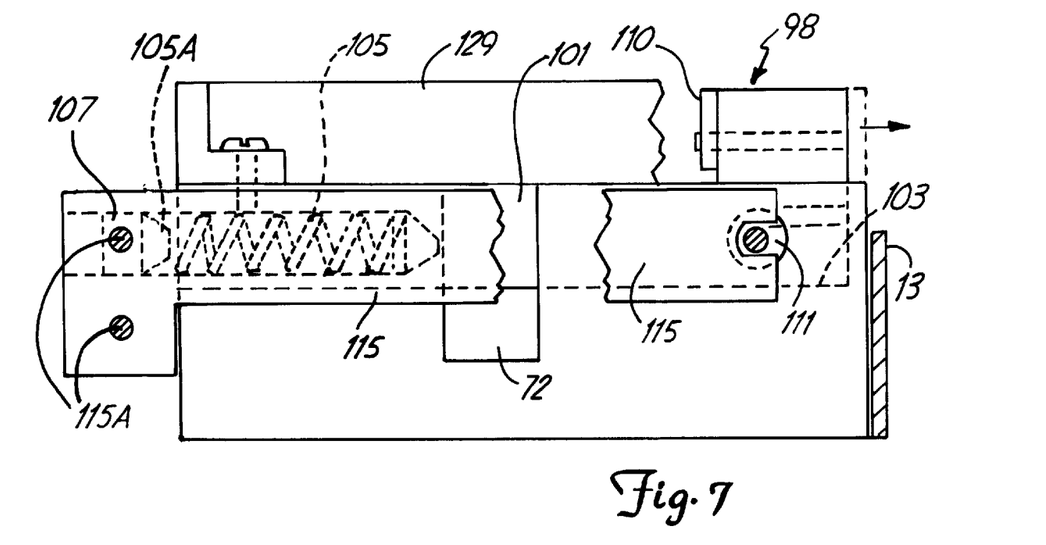
FIG. 7 is an end view taken on line 7—7 in FIG. 6.
Figure 8:
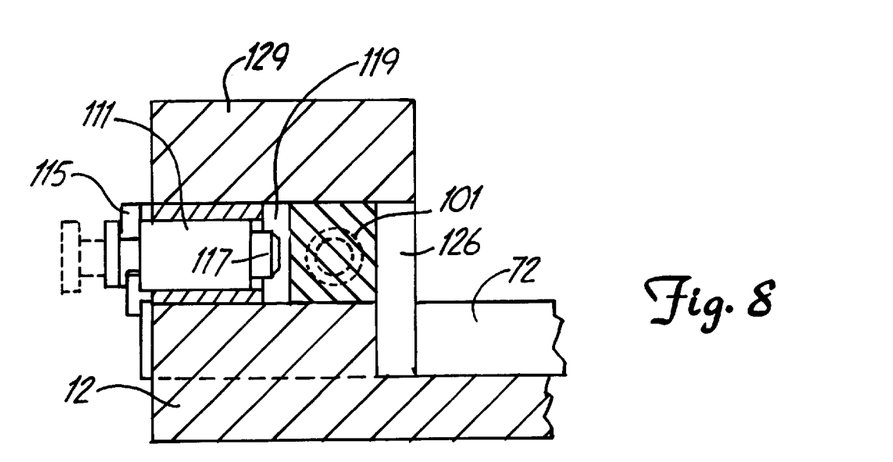
FIG. 8 is a sectional view taken as on line 8—8 in FIG. 6.

The slide bar 101 is of length so that when it moves in direction against the force of the spring 105 as shown by the arrow 105B (see FIG. 6), it will move close to the surface of the block 107 (see FIG. 7) and will be stopped at a desired location. In this position, which is shown in FIGS. 6 and 8, a spring-loaded stop pin 111 will enter a groove or slot 119 under an inward spring force to keep the connector holder latched in a ready position. The force is provided by a leaf spring 115 and acts in direction indicated by arrow 113. One end of spring 115 is held on block 107 with screws 115A. The pin 111 has a latch end 117 that slips into the groove or slot 119 in the connector holder slide bar 101. This will latch the slide bar in an inward position, wherein the connector holder will bear against the side of the scribing disc 96 so that the disc is contiguous with the surface 121 of the connector holder 98 (see FIG. 6).

The flexible bar 92 will be pushed slightly as shown by the arrow in FIG. 6 when the surface 12 engages the disc 96. The arm creates a spring force that will hold the disc 96 against the surface 121 of the connector holder to insure the disc 96 is positioned precisely relative to the fiber 32 that extends from the connector holder each time a connector 29 and fiber are inserted into the holder.

The pin 111 is released by movement of the arm 72, as it slides under action of the plunger. The arm 72 is supported in a recess in the base 12 (see FIGS. 7 and 8), and slides under the slide bar 101. The arm 72 aligns with the lower edge of leaf spring 115 as seen in FIG. 7, where the leaf spring is broken away, and will push the leaf spring and the pin 111 out to the dotted line position shown in FIG. 6 when the arm 72 is near the end of its inward stroke, and after the disc 96, moved by arm 72 has moved across the fiber 32.

At this stage, because of the shape of the straight surface 28 at the outer end of the plunger bar, the clamp slide bar 46 remains in position with the rubber tip 64 clamping the fiber 32 against the anvil surface 62 of the anvil block 63, when the pin 111 is pulled out so that its latch end 117 clears the recess 119. The spring 105 then will force the connector holder assembly, including the connector 29 that is shown in dotted lines schematically in position in FIG. 6 in direction opposite from the arrow 105B until the connector holder strikes and is stopped by an outer case wall 13. The wall 13 is shown in FIGS. 6 and 7. The connector holder 98 is then in a stop position, and the fiber 32 will be separated along the score line or scribe line with a straight, clean break caused by the cleavage of the fiber under tension load.

The slide bar 101 is guided by an end upright wall 125 formed at the end of the base, and a suitable upright guide 126, also formed as part of the base. The anvil 63 also will serve to guide the slide bar 101 in its sliding movement as shown in FIG. 6. The slide bar 101 is held in place with a cover member 129 that is suitably bolted into position as desired. The cover member 129 is broken away in FIG. 6, except for a mounting ear 129A that is shown over the upper right-hand corner of the drawing adjacent to the anvil and a small section at the lower left corner.

When the plunger 14 is released, the spring 20 will retract the plunger slide 16. As the plunger slide moves out from the frame 12, the spring 82 will retract the arm 72 and slide 90, causing the disc 96 to, again, move back to its start position. Also the spring 115 will be urging the pin 111 against a side of slide block 101. As the connector holder has been retracted, there will be a clearance between the connector holder surface 121 and the disc 96, and thus also a clearance between the disc and the freshly cleaved end of the fiber in the connector holder or support 98.

The spring 20 is selected in strength so that it will cause the cam surface 28 to engage the bearing on the pin or bolt 44 and retract the clamp bar 46, thereby releasing the severed end of the fiber 32 that was held against the anvil surface 62 by the rubber pad 64. The severed end of the fiber 32 can then be removed.

Figure 5:
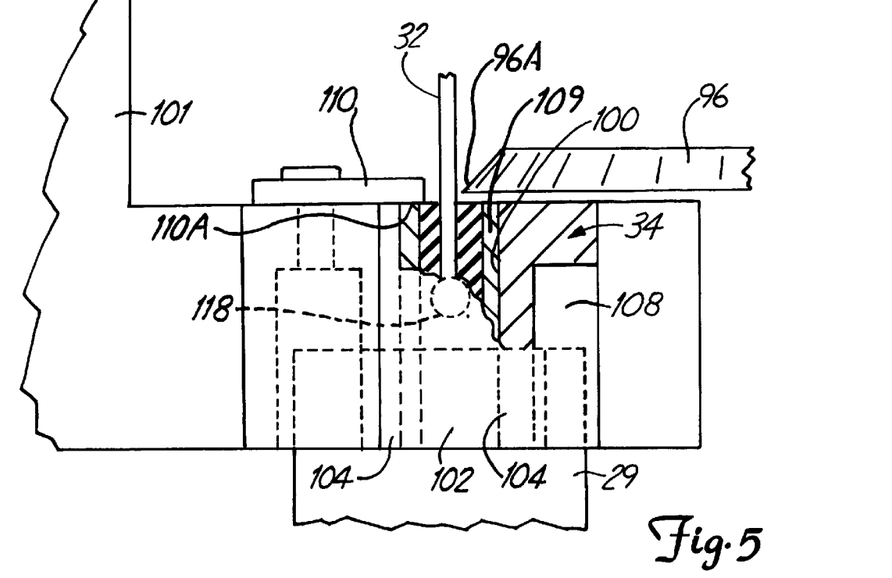
FIG. 5 is a fragmentary top view of the connector holder of FIG. 4.

As shown in FIGS. 4 and 5, the disc 96 has a sharpened edge 96A and the top of the disc is transversely aligned with the bore 100. The bore 100 is open through a slot 102 that extends upwardly, and tapered surfaces 104 provides for guides to place a fiber through the slot 102 and into the bore 100. The connector 29 can be slid on or over the sleeve 106 that is formed by recess 108 around the sleeve 106. These recesses will permit a connector to be slipped into place quite easily, and the slot 102 provides a way of sliding the fiber into the opening 100. The connector has a sleeve or ferrule 109 that surrounds the fiber 32 and an insulation layer. The sleeve slides into the bore 100. A stop plate 110 protrudes slightly into the slot, as shown at 110A in FIG. 4, to provide a stop edge for the connector as it is slid toward the anvil 62.

The connector 29 in the holder 98 is then slid toward the anvil 63 with the fiber 32 (which has been cleared of insulation when the connector is installed). The connector holder is pushed until a click is heard, which will be when the end 117 of the pin 111, which will be riding on the side surface of the slide bar 101 snaps into place in the recess 119 under the load of the spring 115. Then, the disc will be bearing against the surface 121, (the disc will be retracted) and the unit will be ready for depressing the plunger to cause the operation that was previously explained of the disc 96 passing across the fiber, while the support 92, which is flexible, deflects so that there is a score line around almost 180° of the fiber. Then, further movement will cause the arm 72 to push the spring 115 outwardly causing the pin 111 to retract and the end 117 to be pulled out of the groove 119 so that the connector holder will slide under spring load and create the tension necessary to cause the cleavage of the scored fiber 32.

A spring-loaded ball 118 is provided in a cross bore shown at 120, in FIG. 4 extending from the base into the bore 100. The ball 118 is backed with a spring 122 and a small set screw 124. The spring-loaded ball 118 engages the sleeve or ferrule 109 of a connector and positively positions the connector properly relative to the disc 96, as well. The ball will move out of the way as the sleeve or ferrule of the connector is slid into place so the end of the sleeve strikes the stop 110A for precise positioning.

The connector support and stop holds the connector at a known location so that it is precisely positioned relative to the end of the scribing disc 96. The disc support strap 92, which is preferably made of 95-durometer polyurethane, allows the disc edge to slide on the fiber and reduces adjustments because it can accommodate some deflection. The slide link 88 prevents the moving arm 72 from transferring motion into the disc 96, because it, too, is flexible. The rubber tip 64 on the clamp bar 46 provides some give or resilience when it engages the fiber 32 to prevent breakage at that point.

The connector holder or support 98 provides very accurate and reliable positioning of the connector ferrule and the fiber, using the spring-loaded ball and end stop 110A. The resilient side pressure from arm 92 causes the disc to be positively positioned against surface 121 when the connector holder and slide base are latched in place. Consistent results are obtained. Also, the resilient mounting of the disc 96 provides for a controlled scribe force as well, with substantial engagement around the fiber. The scribe line is accurate and true without the need for repeated adjustments.

Although the present invention has been described with reference to preferred embodiments, workers skilled in the art will recognize that changes may be made in form and detail without departing from the spirit and scope of the invention.

What is claimed is:

1. A tool for cleaving an optic fiber having an outer peripheral surface comprising a first support for holding a fiber at a first location, a second support for clamping the fiber at a second spaced location; and a scribing disc movable along a plane perpendicular to a longitudinal axis of the supported fiber, the scribing disc being mounted on a flexible arm, said scribing disc being positioned to engage the outer peripheral surface of the fiber as the scribing disc moves along the plane transversely to the fiber, the arm flexing such that the scribing disc deflects and remains engaged with the fiber as the scribing disc moves transversely to the fiber to scribe a line on a portion of the outer peripheral surface of the fiber.

2. The tool of claim 1, wherein the second spaced location comprises an anvil and a movable bar for pressing the fiber against the anvil, and a resilient tip on the movable bar engaging the fiber.

3. The tool of claim 2, wherein said anvil and said first support are aligned along one side of the fiber.

4. The tool of claim 2 and a spring for spring loading the bar toward the anvil upon actuation of the tool.

5. The tool of claim 1, wherein said disc and flexible arm are mounted onto a slide block, a cam for actuating the slide block, said cam being coupled to said slide block by a slide bar and a compression-carrying flexible link between the slide bar and the slide block.

6. The tool of claim 5, wherein said compression-carrying flexible link comprises a polyurethane link mounted at one end to the slide block and at an opposite end to a slider.

7. The tool of claim 1, wherein said flexible arm comprises a flat strap of polyurethane material, said tool having a plane perpendicular to said flat strap and positioned along one edge of the flat strap.

8. The tool of claim 1, wherein said first support comprises a connector support that has a central bore, a slot opening into said central bore to permit sliding a fiber through said slot and into the bore, and a hub adapted to support a connector ferrule independently of the fiber.

9. The tool of claim 8 and wherein the connector support has a detent ball mounted thereon extending into the central bore for engaging a portion of the connector ferrule to urge the connector ferrule transversely of the bore.

10. The tool of claim 8 and a stop positioned on the support to engage an end of the connector ferrule to axially position the ferrule in the connector holder.

11. The tool of claim 1, wherein said first support is slidably mounted and is releasably movable against a side of the scribing disc at a releasable scribing position of the first support wherein the arm deflects laterally to bias the scribing disc against a reference surface of the first support as the scribing disc moves transversely.

12. The tool of claim 11 and a spring biasing the first support in a direction away from the scribing disc, and an actuator for actuating the scribing disc to move transversely to the fiber for scribing the line on the fiber and subsequently to release the first support from its releasable scribing position before the clamping of the fiber on the second support is released to place a tension load on a fiber clamped against the second support.

13. A method of scribing an optical fiber comprising the steps of supporting and holding a length of said fiber to be scribed at locations spaced along the longitudinal axis of the fiber, said fiber being unsupported adjacent to the first support, mounting a scribing disc on a flexible resilient arm with the disc positioned to engage the fiber when the flexible resilient arm and scribing disc are moved transversely to the fiber, moving the flexible resilient arm and scribing disc transversely to the fiber to cause the scribing disc to engage the fiber and form a scribe line on the fiber, by deflecting the flexible resilient arm as the scribing disc engages and is moved across the fiber so the disc engages a portion of an exterior peripheral surface of the fiber as the scribing disc moves under a biasing force.

14. The method of claim 13, wherein the step of supporting the fiber at one location comprises providing an anvil, and applying a compression force on a side of the fiber opposite the anvil with a resilient material engaging the fiber.

15. The method of claim 13 including the step of preventing rotation of the disc as the disc moves transversely to the fiber and engages the peripheral surface.

16. The method of claim 13 including the step of providing a support ferrule for the fiber, supporting the ferrule in a holder at one of the locations and moving the ferrule axially against a stop to position the fiber.

17. The method of claim 16 comprising the step of releasably latching the first support in a spring-loaded position prior to moving the disc transversely to the fiber, and biasing the scribing disc against the first support in the releasable latched position, and subsequently moving the scribing disc transversely to the fiber and then releasing the latch to place a tension load on the fiber, while applying a force to retain the fiber at a location spaced from the scribing disc.

18. A tool for cleaving an optic fiber having a peripheral surface comprising a frame, a first support on the frame for holding a fiber at a first location, a second support on the frame for clamping the fiber at a second spaced location, a slide block slideably movable transversely to the fiber, a flexible material arm supported on the slide block at one end thereof and having a free end cantilevered from the slide block, a scribing disc mounted at the free end of the flexible material arm, said scribing disc having an edge positioned to engage the fiber supported on the first and second supports as the scribing disc and slide block move transversely to the fiber, the free end of the flexible material arm resiliently bending as the disc engages the fiber and deflects the disc remaining engaged with the peripheral surface of the fiber as the disc moves transversely to the fiber to scribe a line on a portion of the peripheral surface under the force provided by bending of the flexible material arm.

19. The tool of claim 18 wherein the slide block is cam actuated, a cam slidably mounted on the frame, a cam follower bar actuated by the cam to slide in a direction transversely to the fiber, and a link coupling the cam follower bar to the slide block.

20. The tool of claim 19 wherein the cam follower bar is mounted along side the slide block, and the link is a compression-carrying flexible link that is mounted at one end to the cam follower bar and at a second end to the slide block.

* * * * *

UNITED STATES PATENT AND TRADEMARK OFFICE
CERTIFICATE OF CORRECTION

PATENT NO. : 6,024,004
DATED : February 15, 2000
INVENTOR(S) : Joseph P. Kosiarski et al.

It is certified that error appears in the above-identified patent and that said Letters Patent is hereby corrected as shown below:

Column 3, line 41, replace "well", with --will--.

Column 4, line 20, before "when", insert --and deflect down--.

Signed and Sealed this

Thirteenth Day of March, 2001

Attest:

NICHOLAS P. GODICI

Attesting Officer                  Acting Director of the United States Patent and Trademark Office